United States Patent
Shi

(10) Patent No.: US 11,157,206 B2
(45) Date of Patent: Oct. 26, 2021

(54) MULTI-DIE SYSTEM CAPABLE OF SHARING NON-VOLATILE MEMORY

(71) Applicant: Realtek Singapore Private Limited, Singapore (SG)

(72) Inventor: Yunhua Shi, Singapore (SG)

(73) Assignee: Realtek Singapore Private Limited, Singapore (SG)

( * ) Notice: Subject to any disclaimer, the term of this patent is extended or adjusted under 35 U.S.C. 154(b) by 234 days.

(21) Appl. No.: 16/459,548

(22) Filed: Jul. 1, 2019

(65) Prior Publication Data
US 2021/0004178 A1  Jan. 7, 2021

(51) Int. Cl.
*G06F 3/06* (2006.01)
*G06F 13/16* (2006.01)

(52) U.S. Cl.
CPC .......... *G06F 3/0659* (2013.01); *G06F 3/0613* (2013.01); *G06F 3/0626* (2013.01); *G06F 3/0688* (2013.01); *G06F 13/1668* (2013.01)

(58) Field of Classification Search
CPC ............ G06F 13/1668; G06F 13/1605; G06F 3/0659; G06F 3/0688; G06F 3/0613; G06F 3/0658
See application file for complete search history.

(56) References Cited

U.S. PATENT DOCUMENTS

| 7,107,365 | B1 | 9/2006 | Clark | |
|---|---|---|---|---|
| 2004/0123006 | A1* | 6/2004 | Stuber | G06F 13/37 710/240 |
| 2013/0042072 | A1* | 2/2013 | Owen | G06F 13/1605 711/130 |

FOREIGN PATENT DOCUMENTS

TW  I443675 B  7/2014

* cited by examiner

*Primary Examiner* — Ernest Unelus
(74) *Attorney, Agent, or Firm* — Winston Hsu

(57) ABSTRACT

A multi-die system includes a non-volatile memory, a first die having a first operational clock, a second die having a second operational clock, and an arbiter. The first die includes a first bus, a first bus filter coupled to the first bus and the arbiter for controlling access signals, a first access controller coupled to the first bus filter, and a first input/output (I/O) filter coupled to the first access controller, the arbiter and the non-volatile memory for controlling access to the non-volatile memory. The second die includes a second bus, a second bus filter coupled to the second bus and the arbiter, a second access controller coupled to the second bus filter, and a second I/O filter coupled to the second access controller, the arbiter and the non-volatile memory. The first and second operational clocks are independent.

20 Claims, 4 Drawing Sheets

MULTI-DIE SYSTEM CAPABLE OF SHARING NON-VOLATILE MEMORY

BACKGROUND OF THE INVENTION

1. Field of the Invention

The present invention is related to a multi-die system, and particularly to a multi-die system capable of sharing non-volatile memory.

2. Description of the Prior Art

In order to improve system performance and the system complexity cannot be met with a single die, a system with multiple dies becomes a choice. Traditionally, a die with central processing unit (CPU) has a dedicated non-volatile memory (e.g. ROM, non-volatile memory) for instruction, data storage and execute-in-place (XIP) support. Moreover, each die has its own independent operation. Therefore, the power domain and the clock (frequency) domain of each die are completely independent, that is, the power domain and/or the clock domain of each die are not identical, resulting in different levels or/and frequencies of signals within each chip. Moreover, since each chip has its own independent operation, operational clock signals within the respective chips are not synchronized with each other. That is, even if the frequencies of the operation clock signals in the respective chips are the same, the operation clock signals in the respective chips are not synchronized with each other. Thus multiple dedicated non-volatile memories are required for a multi-die system. However the traditional system of dedicated non-volatile memory can incur higher cost and the bandwidth of each non-volatile memory is not used to its maximum capacity.

Therefore, there needs a solution to have a single non-volatile memory shared by multiple dies in order to reduce packaging complexity and cost while maximizing the bandwidth utilization.

SUMMARY OF THE INVENTION

An embodiment provides a multi-die system including a non-volatile memory, a first die having a first operational clock, a second die having a second operational clock and an arbiter. The first die includes a first processor for generating a first control signal, a first access controller coupled to the first processor via a first bus for generating a first access signal to access the non-volatile memory according to the first control signal, a first bus filter coupled between the first processor and the first access controller for controlling the first access control signal to the first access controller, and a first input/output (I/O) filter coupled between the first access controller and the non-volatile memory for controlling the first access signal to the non-volatile memory. The second die having a second operational clock, the second die includes a second processor for generating a second control signal, a second access controller coupled to the second processor via a second bus for generating a second access signal to access the non-volatile memory according to the second control signal; a second bus filter coupled between the second processor and the second access controller, and for controlling the second control signal to the second access controller, and a second I/O filter coupled between the second access controller and the non-volatile memory for controlling the second access signal to the non-volatile memory. The arbiter is located in one of the first die and the second die for generating an arbitration signal according to the first and the second control signals. The first and the second bus filters, and the first and the second I/O filters are controlled according to the arbitration signal. The first and second operational clocks are independent.

An embodiment provides a method of operating a multi-die system in a chip. The chip includes a first die, a second die and an arbiter. The method includes generating, by a first processor in the first die, a first control signal to a first access controller of the first die via a first path, generating, by the first access controller in the first die, a first access signal according to the first control signal to access a non-volatile memory via a second path, generating, by a second processor in the second die, a second control signal to a second access controller of the second die via a third path, generating, by the second access controller in the second die, a second access signal according to the second control signal to access the non-volatile memory via a fourth path, generating, by an arbiter, an arbitration signal according to the first and the second control signals, and controlling the first, the second, the third, and the fourth paths according to the arbitration signal.

An embodiment provides a method of operating a multi-die system in a chip. The multi-die system includes a non-volatile memory, a first die and a second die. The first die includes an arbiter coupled to the second die. The method includes the arbiter granting access for the first die to access the non-volatile memory by default, the first die accessing the non-volatile memory, after an access of the first die, a request signal being de-asserted for one cycle for the arbiter to perform arbitration, and the arbiter granting access for the first die or the second die to access the non-volatile memory according to an arbitration result. The first die and the second die are independent operations.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
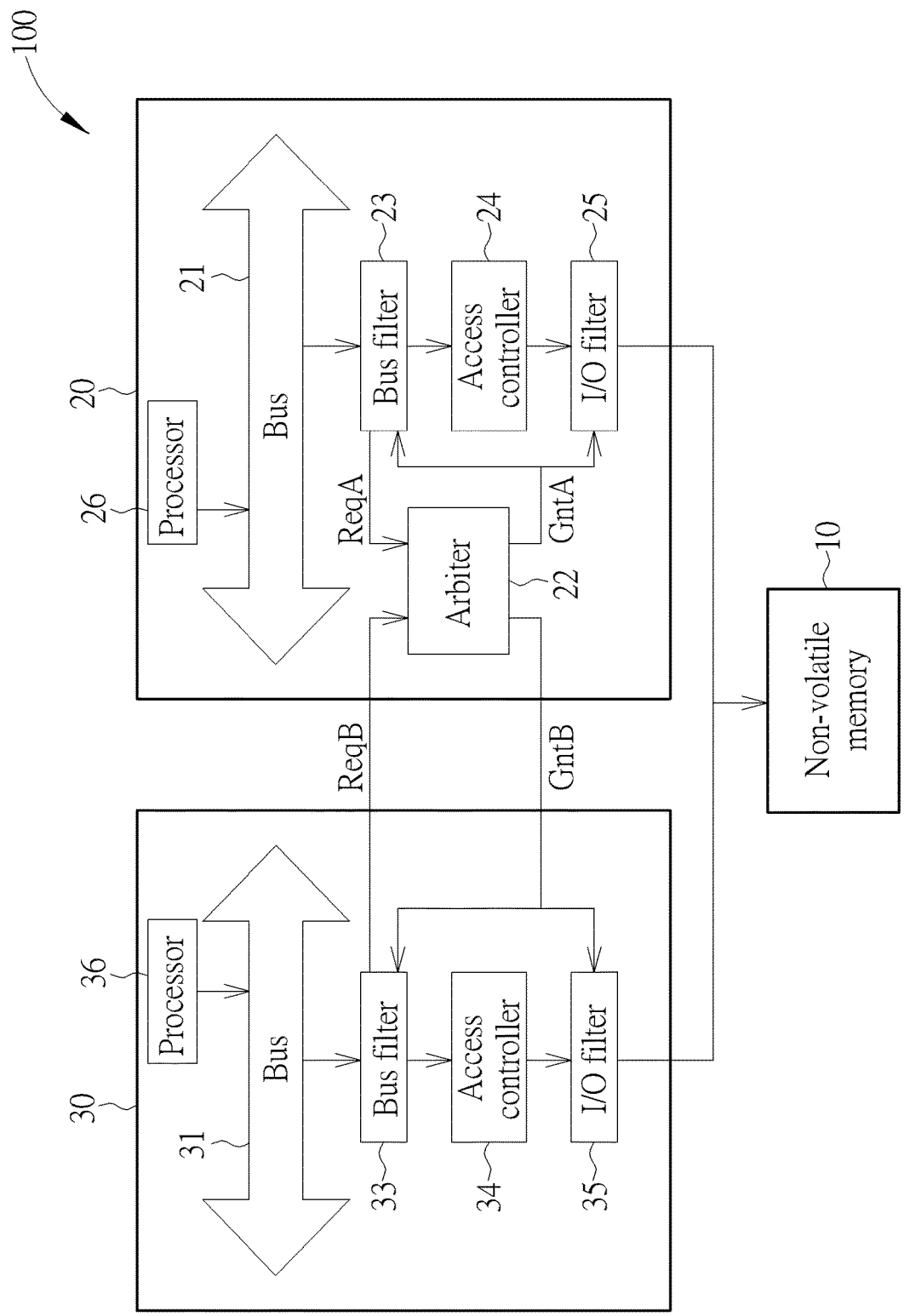
FIG. 1 is a diagram of a multi-die system of an embodiment of present invention.

FIG. 1 is a diagram of a multi-die system 100 of an embodiment of present invention. The multi-die system 100 includes a non-volatile memory 10, a first die 20 and a second die 30. The first die 20 includes a first processor 26, a first bus 21, an arbiter 22 for arbitrating the multi-dies (20, 30) to access the non-volatile memory 10, a first bus filter 23 coupled to the first processor 26 and the arbiter 22 for monitoring and controlling access signals from the first processor 26, a first access controller 24 coupled to the first bus filter 23 for accessing the non-volatile memory 10 according to control signals of the arbiter 22, and a first input/output (I/O) filter 25 coupled to non-volatile the arbiter 22 non-volatile for controlling access to the non-volatile memory 10. The second die 30 includes a second processor 36, a second bus 31, a second bus filter 33 coupled to the second processor 36 and the arbiter 22 for monitoring and controlling non-volatile access signals from the second processor 36, a second access controller 34 coupled to the second bus filter 33 for non-volatile accessing the non-volatile memory 10 according to control signals of the arbiter 22, and a second I/O filter 35 coupled to the second access controller 34, the arbiter 22 and the non-volatile memory 10 for controlling access to the non-volatile memory 10. In one embodiment, the arbiter 22 is disposed outside of the first die 20 and the second die 30. In an embodiment, the power settings (e.g., operate in one of normal mode, sleep mode, suspend mode, and power off) of the first die 20 and the second die 30 are different. In one embodiment, if the performances of the first die 20 and the second die 30 are not the same, the arbiter 22 is disposed in a higher performance die. For example, the first die 20 has a faster clock, higher bandwidth, higher structure, configuration, etc. than the second die 30. For examples, compared to the second die 30, the first die 20 has a faster clock, longer operation in normal mode, higher bandwidth, greater processing power (structure, configuration), and the like.

In an embodiment, the first die 20 and the second die 30 each have a priority to access the non-volatile memory 10. In one embodiment, when the priorities of the dies are the same, the arbiter 22 can use a round-robin scheme to determine which dies can access the non-volatile memory 10. In one embodiment, the level of priority is related to what functions the dies perform. In one embodiment, the priority level is related to the performance of the dies. In the embodiment, the first die 20 has a higher priority than the second die 30 to access the non-volatile memory 10. Also, the first die 20 and the second die 30 may have different clocks, bandwidth, structures, configurations and/or power. Thus the first bus 21 and the second bus 31 may have different clocks, bandwidth, bus structures and/or configurations and the first die 20 may have a faster system clock than the second die 30. The first bus 21 and the bus 31 may be AHB, AXI or one of any types of buses. The non-volatile memory 10 may have an interface such as QSPI or other types of interfaces. In addition, the arbiter 22 would grant access to a request of highest priority if more than one request is issued.

The first bus filter 23 and the second bus filter 33 generate request signals ReqA and ReqB to the arbiter 22 when the non-volatile memory 10 needs to be accessed. The first bus filter 23 passes access signals from the first bus 21 and to first access controller 24 when a grant signal GntA from the arbiter 22 is asserted to the first die 20. Similarly, the second bus filter 33 passes access signals from the second bus 31 and to second access controller 34 when a grant signal GntB from the arbiter 22 is asserted to the second die 30. In contrast, the first bus filter 23 blocks access signals and responds to the first bus 21 and to first access controller 24 accordingly when the grant signal GntA is de-asserted to the first die 20. The second bus filter 33 blocks access signals and responds to the second bus 31 and to second access controller 34 accordingly when the grant signal GntB is de-asserted to the second die 30.

The first I/O filter 25 passes interface signals from the first access controller 24 to the non-volatile memory 10 when the grant signal GntA is asserted to the first die 20. Similarly, the second I/O filter 35 passes interface signals from the second access controller 34 to the non-volatile memory 10 when the grant signal GntB is asserted to the second die 30. In contrast, the first I/O filter 25 stops interface signals from the first access controller 24 to the non-volatile memory 10 when the grant signal GntA is de-asserted to the first die 20. The second I/O filter 35 stops interface signals from the second access controller 34 to the non-volatile memory 10 when the grant signal GntB is de-asserted to the second die 30.

Figure 2:
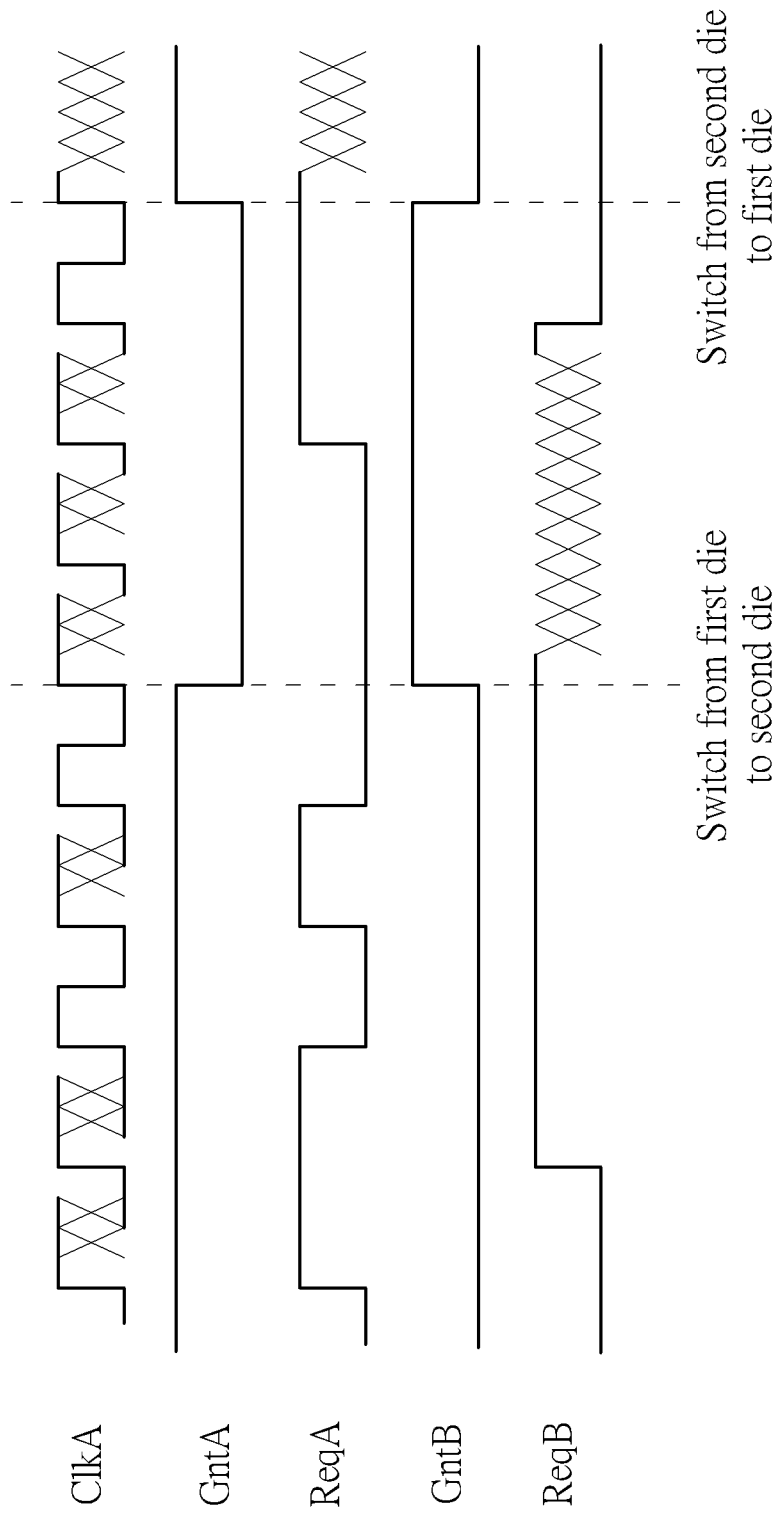
FIG. 2 is a diagram of the operating signals of the arbitration process of the multi-die system in FIG. 1.

FIG. 2 is a diagram of the operating signals of the arbitration process by the arbiter 22. The diagram shows a clock signal ClkA for the first die 20, the grant signal GntA for the first die 20, the request signal ReqA for the first die 20, the grant signal GntB for the second die 30, and the request signal ReqB for the second die 30.

Initially, the arbiter 22 grants access for the first die 20 to access the non-volatile memory 10 by default and by sending the grant signal GntA to the first bus filter 23 and the I/O filter 25. At this time, the first die 20 can access to the non-volatile memory 10. After an access of the first die 20, the request signal ReqA would be de-asserted for one cycle for the arbiter 22 to perform arbitration. If the first die 20 continues to send the request signal ReqA in the de-asserted cycle, the arbiter 22 would continue to grant access to the first die 20 by maintaining the grant signal GntA to the first die 20. In some embodiments, When the first die 20 has completed a certain number of accesses and the second die 30 has sent the request signal ReqB to the arbiter 22, the arbiter 22 would grant access to the second die 30 by sending the grant signal GntB to the second die 30 regardless the first die 20 has a pending request or not.

When the first die 20 no longer asserts the request signal ReqA in the de-asserted cycle, it means the first die 20 has no more pending request. At this time, if the second die 30 asserts a request signal ReqB to the arbiter 22, the arbiter 22 would send a grant signal GntB to the second die 30. Specifically, the second bus filter 33 asserts the request signal ReqB to the arbiter 22 and the arbiter 22 asserts the grant signal GntB back to the second bus filter 33 and the second I/O filter 35 to allow the second die 30 to access the non-volatile memory 10. After an access of the second die 30, the request signal ReqB would be de-asserted for one cycle for the arbiter 22 to perform arbitration to indicate current access has been started. The arbiter 22 also can start arbitration next cycle for next access. If the second die 30 continues to send the request signal ReqB in the de-asserted cycle, the arbiter 22 would continue to grant access to the second die 30 by maintaining the grant signal GntB to the second die 30. Asserts the request signal ReqB after the de-asserted cycle, arbiter 22 would base on priority setting to do arbitration if ReqA is also asserted. When the second die 30 completes configured number of accesses or no more pending accesses. Then, the arbiter 22 would then grant access for the first die 20 if the first die 20 has a pending request. In some embodiments, When the second die 30 has completed a certain number of accesses and the first die 20 has sent the request signal ReqB to the arbiter 22, the arbiter 22 would grant access to the first die 20 by sending the grant signal GntA to the first die 20 regardless the second die 30 has a pending request or not. In some embodiments, different arbitration priority settings can be supported, e.g. fixing priority or number of accesses to be configured. For the fixed priority, assume die 20 has higher priority, GntA will be asserted as long as ReqA is asserted regardless of ReqB status. For number of accesses to be configured, once GntA is asserted, GntA will be de-asserted only when die 20 has completed the number of accesses or no more pending accesses.

Figure 3:
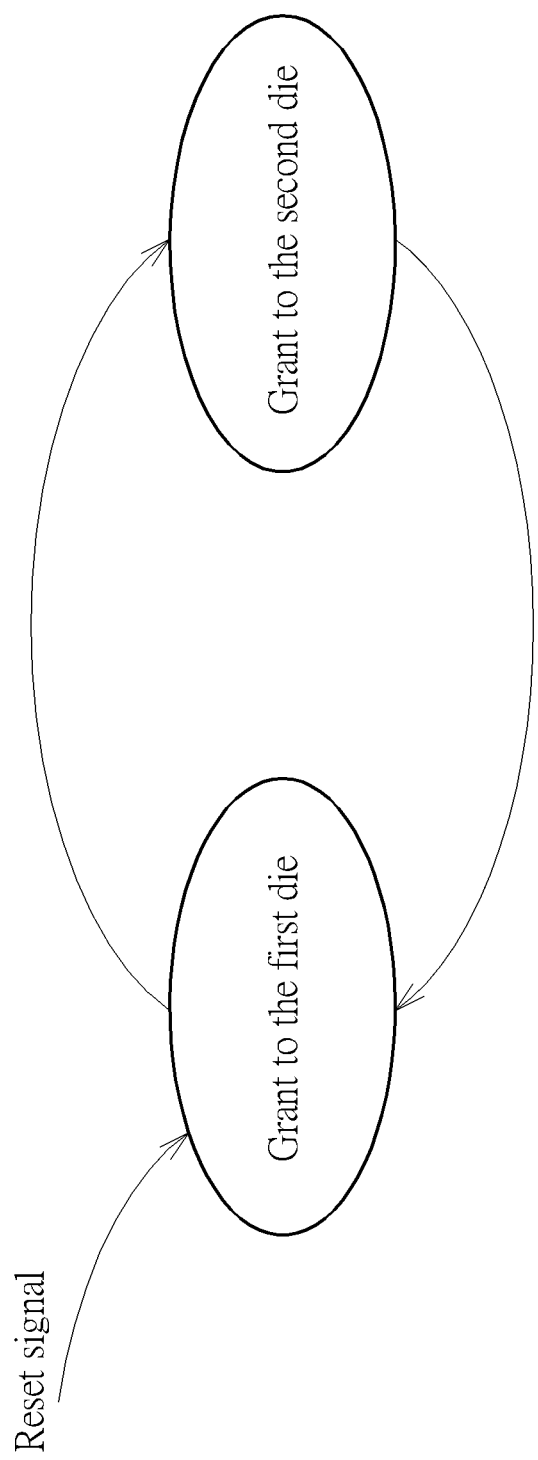
FIG. 3 is a state diagram further explaining the arbitration process in FIG. 2.

FIG. 3 is a state diagram further explaining the arbitration process. The diagram shows a round-robin arbitration process. The arbiter 22 makes arbitration based on priority setting. Initially a reset signal sets grant to the first die 20 by default. If the first die 20 has completed a certain number of accesses and/or has no more pending request, and a request has been sent from the second die 30, the arbiter 22 would switch the grant from the first die 20 to the second die 30. If the second die 30 has completed a certain number of accesses and/or has no more pending access, and a request has been sent from the first die 20, the arbiter 22 would switch the grant from the second die 30 to the first die 20. If no request has been sent from either the first die 20 or the second die 30, the arbiter 22 could leave the grant at the last state for the following cycles until receiving a new request.

Figure 4:
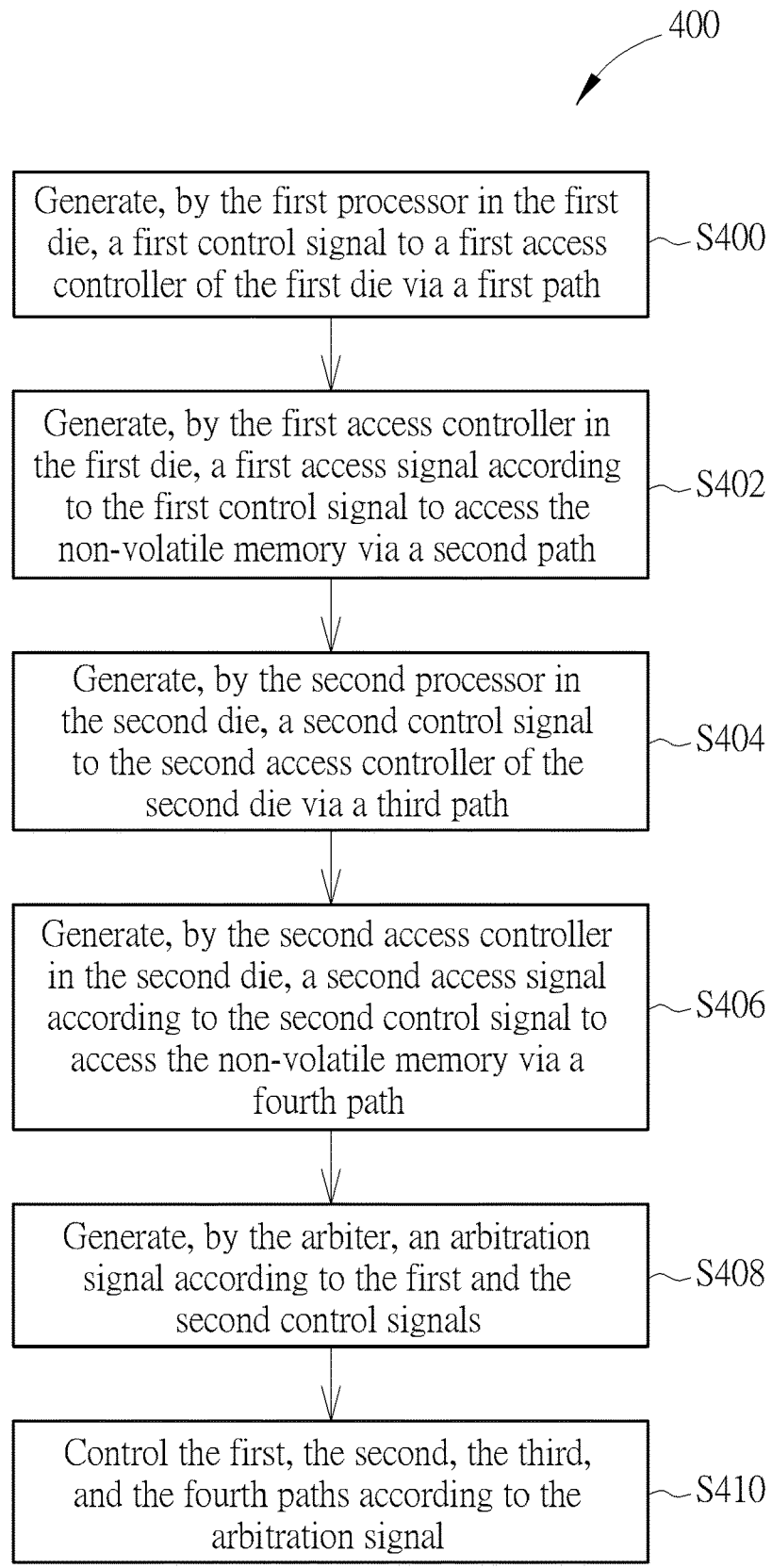
FIG. 4 is a flowchart of a method of operating a multi-die system of FIG. 1.

FIG. 4 is a flowchart of a method 400 of operating a multi-die system 100. The method may include the following steps:

S400: Generate, by the first processor 26 in the first die 20, a first control signal to a first access controller 24 of the first die 20 via a first path;

S402: Generate, by the first access controller 24 in the first die 20, a first access signal according to the first control signal to access the non-volatile memory 10 via a second path;

S404: Generate, by the second processor 36 in the second die 30, a second control signal to the second access controller 34 of the second die 30 via a third path;

S406: Generate, by the second access controller 34 in the second die 30, a second access signal according to the second control signal to access the non-volatile memory 10 via a fourth path;

S408: Generate, by the arbiter 22, an arbitration signal according to the first and the second control signals; and S410: Control the first, the second, the third, and the fourth paths according to the arbitration signal.

In summary, with the aforementioned implementation, the multi-die system can share a single non-volatile memory to execute instruction in place, store data, program and erase the non-volatile memory to update data and instruction, thus increasing bandwidth utilization of the non-volatile memory. The implementation can reduce the complexity and cost of the system package thus reducing manufacturing cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-die system comprising:
a non-volatile memory;
a first die having a first operational clock, the first die comprising:
a first processor, configured to generate a first control signal;
a first access controller, coupled to the first processor via a first bus, and configured to generate a first access signal to access the non-volatile memory according to the first control signal;
a first bus filter coupled between the first processor and the first access controller, and configured to control the first control signal to the first access controller; and
a first input/output (I/O) filter coupled between the first access controller and the non-volatile memory, configured to control the first access signal to the non-volatile memory;
a second die having a second operational clock, the second die comprising:
a second processor, configured to generate a second control signal;
a second access controller coupled to the second processor via a second bus, configured to generate a second access signal to access the non-volatile memory according to the second control signal;
a second bus filter coupled between the second processor and the second access controller, and configured to control the second control signal to the second access controller; and
a second I/O filter coupled between the second access controller and the non-volatile memory, configured to control the second access signal to the non-volatile memory; and
an arbiter, located in the first die, configured to generate a first grant signal and a second grant signal according to the first control signal from the first processor and the second control signal from the second processor;
wherein the first bus filter and the first I/O filter are controlled according to the first grant signal, and the second bus filter and the second I/O filter are controlled according to the second grant signal;
wherein when the arbiter grants access for the first die to access the non-volatile memory, the arbiter transmits the first grant signal to the first bus filter and the first I/O filter and de-asserts the second grant signal to the second bus filter and the second I/O filter;
wherein when the arbiter grants access for the second die to access the non-volatile memory, the arbiter transmits the second grant signal to the second bus filter and the second I/O filter and de-asserts the first grant signal to the first bus filter and the first I/O filter; and
wherein the first and second operational clocks are independent.

2. The multi-die system of claim 1 wherein the first die has a higher priority than the second die to access the non-volatile memory.

3. The multi-die system of claim 1, wherein priorities of the first die and the second die are determined according to performances of the first and the second dies.

4. The multi-die system of claim 1 wherein a priority the first die and that of the second die are the same.

5. The multi-die system of claim 1 wherein the first and the second operational clocks are different.

6. The multi-die system of claim 1 wherein at least one of bus clock, bus bandwidth, bus structure, and bus configuration of the first and the second buses are different.

7. The multi-die system of claim 1 wherein power setting of the first die and that of the second die are different.

8. The multi-die system of claim 1 wherein the first and the second bus filters, and the first and the second I/O filters are controlled according to the first grant signal and the second grant signal such that the operational clocks in the first and the second dies are not synchronized with each other is overcome.

9. A method of operating a multi-die system in a chip, the chip comprising a first die and a second die, the method comprising:
generating, by a first processor in the first die, a first control signal to a first access controller of the first die via a first bus filter in the first die;
generating, by the first access controller in the first die, a first access signal according to the first control signal to access a non-volatile memory via a first input/output (I/O) filter in the first die;

generating, by a second processor in the second die, a second control signal to a second access controller of the second die via a second bus filter in the second die;

generating, by the second access controller in the second die, a second access signal according to the second control signal to access the non-volatile memory via a second I/O filter in the second die;

generating, by an arbiter in the first die, a first grant signal and a second grant signal according to the first and the second control signal; and controlling the first bus filter and the first I/O filter according to the first grant signal; and controlling the second bus filter and the second I/O filter according to the second grant signal;

wherein when the arbiter grants access for the first die to access the non-volatile memory, the arbiter transmits the first grant signal to the first bus filter and the first I/O filter and de-asserts the second grant signal to the second bus filter and the second I/O filter;

wherein when the arbiter grants access for the second die to access the non-volatile memory, the arbiter transmits the second grant signal to the second bus filter and the second I/O filter and de-asserts the first grant signal to the first bus filter and the first I/O filter; and wherein the first die having a first power and a first operational clock and the second die having a second power and a second operational clock operate independently.

10. The method of claim 9, wherein the first and the second operational clocks are different.

11. The method of claim 9, wherein the first and the second operational clocks are unsynchronized.

12. The method of claim 9, wherein at least one of bus clock, bus bandwidth, bus structure, and bus configuration of the first and the second dies are different.

13. The method of claim 9, wherein first bus filter, the first I/O filter, the second bus filter, and the second I/O filter are controlled according to the first grant signal and the second grant signal such that the operational clocks in the first and the second dies are not synchronized is overcome.

14. The method of claim 9 further comprising:

after an access of the first die, de-asserting a request signal for one cycle for the arbiter to perform arbitration;

wherein when the first die is granted by the arbiter to access the non-volatile memory, granting access for the second die to access the non-volatile memory is stopped by the arbiter; and wherein when the second die is granted by the arbiter to access the non-volatile memory, granting access for the first die to access the non-volatile memory is stopped by the arbiter.

15. The method of claim 14 wherein the arbiter grants access for the first die to access the non-volatile memory if the first die has a pending request and/or has not completed a certain number of accesses.

16. The method of claim 14 wherein the arbiter grants access for the second die to access the non-volatile memory if the first die has no pending request or has completed a certain number of accesses and the second die has a pending request.

17. The method of claim 16 further comprising:

after an access of the second die, de-asserting a request signal for one cycle to indicate a current access has been started.

18. The method of claim 17 wherein the arbiter grants access for the first die to access the non-volatile memory if the second die has no pending request or has completed a certain number of accesses and the first die has a pending request or if the first die has a higher priority than the second die and the first die has a pending request.

19. The method of claim 17 wherein the arbiter grants access for the second die to access the non-volatile memory if the second die has a pending request and has not completed a certain number of accesses.

20. The method of claim 9, wherein the first die has a higher priority than the second die to access the non-volatile memory.

* * * * *